United States Patent
Meltola et al.

(10) Patent No.: US 7,198,958 B2
(45) Date of Patent: Apr. 3, 2007

(54) METHOD FOR INCREASING HYDROPHILICITY OF FLUORESCENT LABEL COMPOUNDS

(75) Inventors: Niko Meltola, Piispanristi (FI); Aleksi Soini, Lieto (FI)

(73) Assignee: Arctic Diagnostics Oy, Turku (FI)

( * ) Notice: Subject to any disclaimer, the term of this patent is extended or adjusted under 35 U.S.C. 154(b) by 304 days.

(21) Appl. No.: 10/482,057

(22) PCT Filed: Jul. 1, 2002

(86) PCT No.: PCT/FI02/00581

§ 371 (c)(1),
(2), (4) Date: Dec. 29, 2003

(87) PCT Pub. No.: WO03/004569

PCT Pub. Date: Jan. 16, 2003

(65) Prior Publication Data

US 2004/0147728 A1    Jul. 29, 2004

Related U.S. Application Data

(60) Provisional application No. 60/301,831, filed on Jul. 2, 2001.

(30) Foreign Application Priority Data

Jul. 2, 2001    (FI) .................................. 20011438

(51) Int. Cl.
  *G01N 33/533*   (2006.01)
  *G01N 1/30*     (2006.01)
  *G01N 21/76*    (2006.01)
  *C07K 17/06*    (2006.01)
  *C07D 239/70*   (2006.01)

(52) U.S. Cl. .................. 436/546; 435/6; 435/40.5; 436/172; 530/391.5; 530/402; 530/409; 544/180; 544/229

(58) Field of Classification Search .............. 530/391.5, 530/402, 409; 548/405; 436/172, 546; 435/6, 435/40.5; 544/180, 229
See application file for complete search history.

(56) References Cited

U.S. PATENT DOCUMENTS

| 4,489,165 A | 12/1984 | Wagner et al. ............... 436/500 |
| 4,774,339 A | 9/1988 | Haugland et al. ............ 548/405 |
| 5,274,113 A | 12/1993 | Kang et al. .................. 548/405 |
| 5,451,663 A | 9/1995 | Kang et al. .................. 530/367 |
| 5,512,486 A | 4/1996 | Giese et al. .................. 436/63 |
| 5,869,689 A | 2/1999 | Zhang et al. ................ 548/405 |
| 5,958,783 A | 9/1999 | Josel et al. .................... 436/84 |

FOREIGN PATENT DOCUMENTS

| WO | WO 93/09185 | 5/1993 |
| WO | WO 97/39326 | 10/1997 |
| WO | WO 99/63344 | 12/1999 |

OTHER PUBLICATIONS

*STN International, File Chemcats, AN 2000:175375, http://www/probes.com/handbook/print/0104.html.
*Wories et al., "A Novel Water-soluble Fluorescent Probe," 104 *Recl. Trav. Chim. Pays-BAs*, 288-291 (1985).
*Hänninen et al., A New Microvolume Technique for Bioaffinity Assays Using Two Photon Excitation, 18 *Nature Biotechnology* 548-550 (2000).

*Primary Examiner*—Mary E. Ceperley
(74) *Attorney, Agent, or Firm*—James C. Lydon

(57) ABSTRACT

A fluorescent label compound of formula

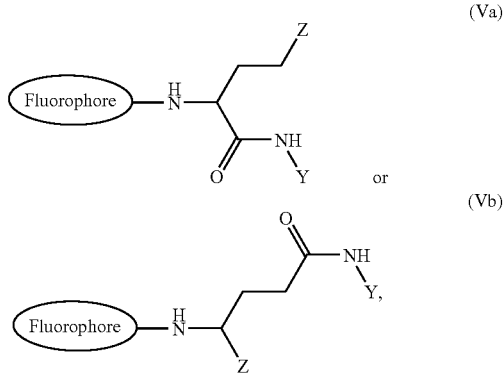

where Z is a reactive group that can be used for covalent coupling of the fluorescent label compound to other molecule. Either the fluorophore is a dipyrrometheneboron difluoride dye and Y is a water-solubilizing moiety, or Y is —$CH_2CH_2SO_3^-$ $X^+$ where $X^+$ is a cation. The use of the compounds in bianalytical assays and cytological or histological staining methods, and a method for increasing the hydrophilicity of fluorescent compounds, are also disclosed.

14 Claims, 7 Drawing Sheets

BOC-Glu(OtBu)-OSu

Compound 1

Compound 2

Compound 3

Compound 4

Compound 5

Compound 6

Compound 7

Compound 8

Compound 9

Compound 10

Compound 11

Compound 12

Compound 13

Compound 14

Compound 15

Compound 16

Compound 17

METHOD FOR INCREASING HYDROPHILICITY OF FLUORESCENT LABEL COMPOUNDS

This application is a U.S. National Stage of International application PCT/FI02/00581, filed Jul. 1, 2002, and which claims priority of U.S. provisional application No. 60/301,831, filed Jul. 2, 2001 and Finnish patent application 20011438, filed Jul. 2, 2001.

FIELD OF THE INVENTION

The present invention relates to fluorescent label compounds and to the use of these compounds in aqueous solutions. More precisely, the present invention relates to a method for increasing hydrophilicity of these fluorescent label compounds.

BACKGROUND OF THE INVENTION

The publications and other materials used herein to illuminate the background of the invention, and in particular, cases to provide additional details respecting the practice, are incorporated by reference.

Fluorescent label molecules are often used for studying of biological samples with immunochemical, cytological and histological techniques. These applications take place in aqueous solutions and one of the key requirements for the label molecule is a sufficient hydrophilicity and solubility to aqueous solutions [Hemmilä I. A., Applications of Fluorescence in Immunoassays, (ed. Winefordner J. D.) John Wiley & Sons, New York 1991]. As commonly known, the hydrophobic interactions between a fluorophore and a target molecule often leads to decrease in photophysical performance of the fluorophore. In some cases a hydrophobic label can also result in unwanted precipitation of the labelled conjugate. Hydrophilicity of the fluorescent label and also solubility of the fluorescent label in aqueous solutions can be increased by appropriate substitution of the fluorophore with a hydrophilic water-solubilizing group. These hydrophilic water-solubilizing groups include ammonium or alkali metal salts of sulfonic or carboxylic acids, quaternary ammonium salts, amino and hydroxyl groups.

For example, sulfonic acid groups have been used in Rhodamine and Cyanine dyes for improving their solubility in aqueous solutions. Derivatives of such dyes that can be used for labelling of biomolecules are also commercially available. Commercially available fluorescent labelling reagents that are soluble in aqueous solutions include Cy dyes (Amersham Pharmacia Biotech) and Alexa Dyes (Molecular Probes).

Fluorescent labelling reagents are usually attached to biomolecules via covalent linkage. For this attachment (labelling) the fluorescent labelling reagents have a functional group that can be reacted with another functional group in a biomolecule. Commonly used reactive groups include for example reactive carboxylic acid esters and anhydrides, isothiocyanates, maleimides, haloacetamides, triazines, amines, sulfonyl halides, hydrazines and alcohols. Reactive groups that are commonly used for labelling purposes can be found for example in: Haugland R. P., Handbook of Fluorescent Probes and Research Chemicals, 6$^{th}$ ed, Molecular Probes, Eugene, Oreg., 1996.

Dipyrromethenboron Difluoride Dyes

A class of fluorescent dyes, dipyrromethenboron difluoride dyes, have many desirable properties: High quantum efficiency, sharp absorption and emission bands and high absorption coefficient. These dyes have been first described by Treibs and Kreuzer, Liebigs Ann. Chem. 718 (1968) 208 and by Wories H. J. et al., Rec. Trav. Chim. Pays-Bas 104 (1985) 288. Since then dipyrromethenboron difluoride dyes have found various applications. A wide variety of dipyrromethenboron difluoride dyes are commercially available today (Haugland R. P., Handbook of Fluorescent Probes and Research Chemicals, 6th ed, Molecular Probes, Eugene, Oreg., 1996).

Syntheses and fluorescence properties of different derivatives of these dyes have been described in publications and patents. U.S. Pat. No. 4,774,339 describes the use of dipyrromethenboron difluoride dyes as fluorescent labels. According to U.S. Pat. No. 4,774,339 the fluorescence properties of dipyrromethenboron difluoride dyes are not sensitive to solvent or pH. These dyes have also narrow absorption and emission bandwidths, high quantum yield and high photostability.

The basic chromophore (I) of the dipyrromethenboron difluoride dye has absorption and emission maxima around 500 nm.

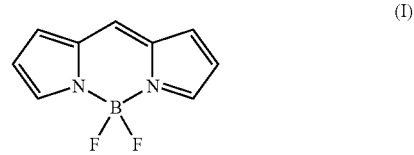

(I)

Basic chromophore of dipyrromethenboron difluoride dye

The absorption and emission wavelengths of the dipyrromethenboron difluoride dyes can usually be altered by changing the substituents of the chromophore. Lengthening of the π-electron conjugation leads to the shift of the emission and absorption bands to longer wavelengths. Lengthening of the π-electron conjugation affects also photostability, solubility and fluorescence quantum yield. U.S. Pat. No. 5,274,113, US 5,451,663 and WO 93/09185 describe dipyrromethenboron difluoride labelling reagents that have absorption maxima between 525 nm and 650 nm. This shift in absorption and emission wavelengths has been achieved by adding an unsaturated organic group into the chromophore. The patents describe the use of aryl, heteroaryl and alkenyl substituents for lengthening of the π-electron conjugation pathway. U.S. Pat. No. 5,248,782 describes heteroaryl substituted dipyrromethenboron difluoride dyes and U.S. Pat. No. 5,187,288 describes ethenyl substituted dipyrromethenboron difluoride dyes that have absorption maxima between 550 nm and 670 nm. The shift in absorption and emission wavelengths was in most cases accompanied with an increased absorption coefficient and photostability. The lengthening of the π-electron conjugation pathway was also described by Chen J. et al., J. Org. Chem., 65 (2000) 2900. Chen J. et al. describe aryl substituted dipyrromethenboron difluoride dyes that have absorption maxima between 620 and 660 nm and fluorescence emission between 630 and 680 nm. U.S. Pat. No. 5,433,896 describes dipyrromethenboron difluoride dyes that contain fused aryl substituents. These dibenzopyrromethene boron difluoride dyes have absorption and emission maxima between 600 nm and 740 nm. The molar absorption coefficient of these dyes was most often above 100 000 cm$^{-1}$ M$^{-1}$.

Wories H. J. et al., *Rec. Trav. Chim. Pays-Bas* 104 (1985) 28 describe a method for introducing sulfonic acid groups to dipyrrometheneboron difluoride dyes. They report mono- and disulfonated dipyrrometheneboron difluoride dyes that have absorption maxima at 495 nm and 491 nm, and emission maxima at 515 and 510 nm.

The dipyrrometheneboron difluoride dyes have found various applications as fluorescent labels. The synthesis and versatility of these dyes has been reported in publications and patents referred to above. Most of these dyes however suffer from intrinsic hydrophobicity that limits their use for fluorescent labelling of biomolecules. That is the case especially with dipyrrometheneboron difluoride dyes that contain aryl substituents.

Bioanalytical Applications of Fluorescence

Fluorescence has found various applications in the field of bioanalytics.

Applications such as immunoassays, DNA-hybridisation assays and receptor binding assays using fluorescence as a detection method have been introduced during the last three decades. These assays utilise specific bioaffinity reactions in determination of the analyte amount in a sample. The amount of analyte can be determined by monitoring the fluorescence signal that depends on the amount of bound analyte. These assays can also be based on monitoring of the change on the fluorescence properties upon specific binding reaction. This change in fluorescence property can be either change in fluorescence intensity, change in emission wavelength, change in decay time or change in fluorescence polarisation.

Immunoassays have been used extensively in clinical diagnostics for determination of certain diseases or physiological condition. Immunoassays can be categorised to two different types of assays, competitive and non-competitive assays. In the competitive method, the labelled antigen (secondary biospecific reagent) competes with the analyte to bind to a limited quantity of antibody (primary biospecific reagent). The concentration of analyte can be determined from the proportion of the labelled antigen bound to the antibody or from the proportion of the free fraction of the labelled antigen. In non-competitive method (immunometric method) the analyte is bound to an excess amount of binding antibody (primary biospecific reagent). An excess of labelled antibody (secondary biospecific reagent) binds to another site of the analyte. The amount of analyte can be determined on basis of the fraction of the labelled antibody bound to the analyte. The assay methods can also be divided to heterogeneous and to homogeneous (separation free) methods. Separation of the bound and free fractions is necessary in heterogeneous assays but not in homogeneous assays (Miyai K., *Principles and Practice of Immunoassay*, (ed. Price C. P. and Newman D. J.) Stockton Press, New York 1991, 246 and Hemmilä I. A., *Applications of Fluorescence in Immunoassays*, (ed. Winefordner J. D.) John Wiley & Sons, New York 1991).

Linkers and Spacers

In chemistry, the term linker is usually used for a moiety that links two molecules to each other. The term spacer on its turn is used for a linker moiety to point out the space that the linking moiety forms between the two target molecules. Frequently used linker and spacer reagents contain two different functional groups that can be specifically reacted with target molecules. These bifunctional linkers and spacers can be either homobifunctional (both functional groups are similar to each other) or heterobifunctional (functional groups are different). Frequently used linkers include amino acids, oligopeptides and diaminoalkanes. A wide variety of different linkers and spacers are commercially available (for example Pierce Chemical Company, Rockford, Ill., U.S.A.).

Spacers have been frequently used in labelling of small hapten molecules, for example in labelling of steroid hormones. A spacer is used to prevent the label to interfere with the bioaffinity reaction. Tiefenauer L. X. and Andres R. Y., *J. Steroid Biochem.* 35 (1990) 633 describe the effect of spacer length of a biotin labelled estradiol in an enzyme linked immunosorbent assay (ELISA). Biotin-estradiol conjugates without a spacer were not recognised by the antibody while conjugates with 6-amidohexanoic acid spacer between the estradiol and biotin were properly bound by the antibody.

Lefevre C. et al., *Bioconjugate Chem.* 7 (1996) 482 describe the use of a 6-aminohexanoic acid spacer between a fluorophore and a reactive group. The fluorophores that were used by Lefevre C. et al. were Sulforhodamine 101 and Lissamine rhodamine B. With both fluorophores the fluorescence yield of the corresponding protein conjugates were improved in respect to the fluorophore-protein conjugates without the spacer.

Chang A.-C. et al., *J. Med. Chem.* 39 (1996) 1729 describe the use of mono-, di- and tetraglycyl linkers with fluorescein isothiocyanate. They used fluorescein isothiocyanate as a fluorescent label in receptor binding studies. The hydrophilic glycyl linkers between the fluorophore and the pharmacophore were found to reduce nonspecific binding. The best results were obtained with tetraglycyl linker, while a fluorescein isothiocyanate conjugate without a linker exhibited only non-specific binding.

Randolph J. B. and Waggoner A. S., *Nucleic Acids Res.* 25 (1997) 2923 describe the effect of linker length and label hydrophilicity in labelling of oligonucleotides with Cy3™ dye (a disulfonated label) and the monosulfonated form of the same dye. Randolph and Waggoner describe the labelling of amino-modified nucleotides (C2dT and C6dT) where the linker unit was either diaminoethane or diaminohexane. According to Randolph and Waggoner the best results were obtained by using the long linker (diaminohexane) and the disulfonated, more hydrophilic label (Cy3).

U.S. Pat. No. 5,958,783 describe metal complexes with a charged linker. According to U.S. Pat. No. 5,958,783 the metal complexes, preferably ruthenium complexes, contain a charged linker moiety between the metal complexing ligand and the reactive group. According to U.S. Pat. No. 5,958,783 the charged linker should preferably contain 2 to 4 charge carriers. U.S. Pat. No. 5,958,783 also describes a glutamic acid residue as a part of the linker where one of the two carboxylic acid groups of glutamic acid is denoted as a charge carrier.

U.S. Pat. No. 4,489,165 describe chromogenic tracers that contain a spacer radical between a chromogen and a ligand. U.S. Pat. No. 4,489,165 describe spacers that are derived from aminoacids, especially from lysine. The preferred chromogen according to U.S. Pat. No. 4,489,165 is Fluorescein.

U.S. Pat. No. 5,512,486 describe labelling of phosphate group using imidazole as a reactive group. U.S. Pat. No. 5,512,486 also describes a dipyrrometheneboron difluoride dye as a label for labelling of phosphate groups.

OBJECT AND SUMMARY OF THE INVENTION

An object of the invention is to provide alternative and improved fluorescent label compounds to be used in bioanalytical assays and cytological or histological staining methods. Another object of the invention is to provide a method for increasing the hydrophilicity of fluorescent compounds.

Thus this invention concerns fluorescent label compounds of formula

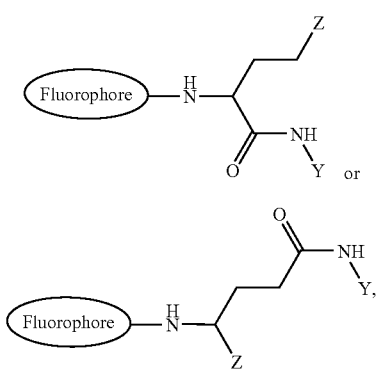

(Va) or (Vb)

wherein Z is a reactive group that can be used for covalent coupling of the fluorescent label compound to other molecules. Either the fluorophore is a dipyrrometheneboron difluoride dye and Y is a water-solubilizing moiety, or Y is —CH$_2$CH$_2$SO$_3^-$X$^+$ where X$^+$ is a cation.

The invention also concerns fluorescent conjugates comprising a biologically active molecule labelled with said fluorescent label compounds (Va and Vb) as defined above.

The invention further concerns a bioanalytical assay method for determining an analyte from a biological fluid or suspension, said assay comprising at least one biologically active molecule, wherein at least one of said biologically active molecules is labelled with said fluorescent label compound (Va and Vb) as defined above.

The invention additionally concerns a cytological or histological staining method comprising at least one biologically active molecule wherein at least one of said biologically active molecules is labelled with said fluorescent label compound Va and Vb) as defined above.

The invention does as well concern a method for increasing hydrophilicity of a fluorescent compound by reacting said fluorescent compound with a hydrophilic glutamic acid linker compound that has the structure

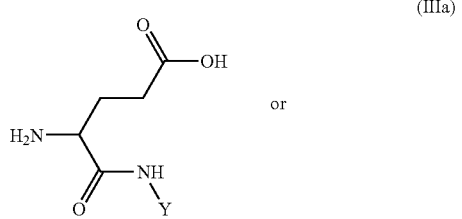

(IIIa) or

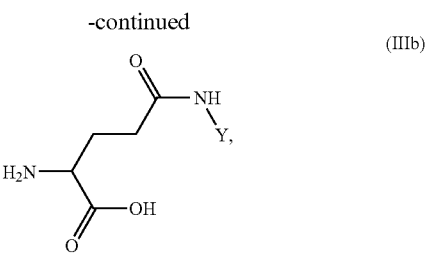

(IIIb)

where Y is a water-solubilizing moiety —CH$_2$CH$_2$SO$_3^-$X$^+$ where X$^+$ is a cation.

DETAILED DESCRIPTION OF THE INVENTION

Figure 1:
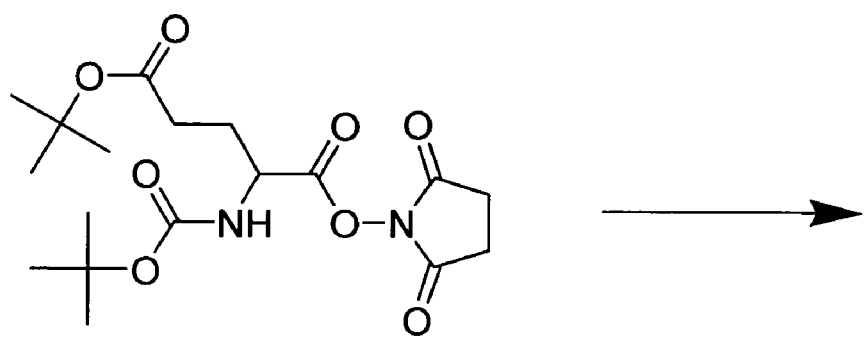
FIG. 1 shows a hydrophilic glutamic acid-taurine linker compound (compound 1) synthesised according to example 1 from BOC-Glu(OtBu)-OSu. X$^+$ is a cationic counterion.
Figure 1:
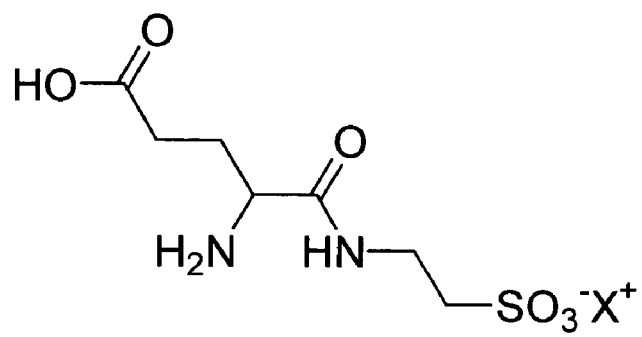

This invention introduces highly hydrophilic linker compounds that can be used for increasing hydrophilicity of otherwise hydrophobic fluorophores. These hydrophilic linker compounds are highly useful especially when the fluorophore is coupled to a biologically active molecule, such as a hapten, biologically active ligand, drug, peptide, oligonucleotide, nucleotide, nucleic acid, polypeptide, protein, antibody, or a fragment of an antibody. This invention introduces a simple method that can be used for increasing the hydrophilicity of the fluorophores and also for increasing the solubility of these compounds to aqueous solutions. The method according to the present invention offers also means for reducing unspecific binding that originates from the hydrophobic nature of a fluorophore. Another advantage of the present invention is that the use of this method introduces a spacer arm between the fluorophore and the biomolecule, which reduces fluorophore-biomolecule interactions and can also improve the biospecific recognition reaction. This invention provides excellent tools for monitoring bioaffinity reactions in aqueous solutions because the new labelling reagents according to the present invention show improved solubility in aqueous solutions and retain their fluorescence properties in labelled biomolecules.

Hydrophilicity and solubility of a fluorescent label to aqueous solutions is often essential in terms of reducing unspecific binding and retaining photophysical properties of a label in labelled biomolecules. A method for increasing the hydrophilicity of fluorescent compounds, that is an object of the present invention, can be used to increase hydrophilicity and water-solubility of otherwise hydrophobic fluorophores. This method is based on the use of derivatives of glutamic acid. Glutamic acid (II) is an α-amino acid that contains an amino group and two carboxylic acid groups:

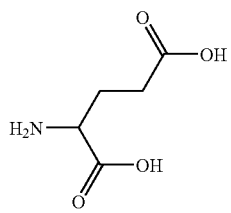

(II)

The two carboxylic acid groups can be differentiated and selectively reacted with other molecules to provide highly hydrophilic linker compounds with the following structures (IIIa and IIIb):

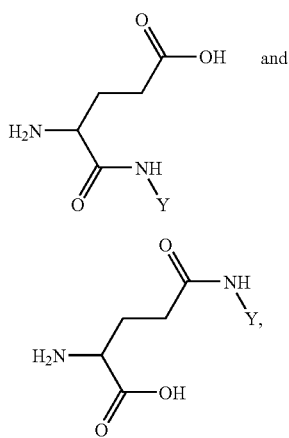

(IIIa)

(IIIb)

where Y is a water-solubilizing moiety. The water-solubilizing moiety can be for example a carbohydrate, ammonium or alkalimetal salt of sulfonic acid or quaternary ammonium salt. These hydrophilic linker compounds are ideally suited for increasing hydrophilicity of fluorescent compounds. The linker compounds can be attached to amino reactive fluorophores, for example to succinimidyl ester derivatives of fluorophores to yield the following structures (IVa and IVb):

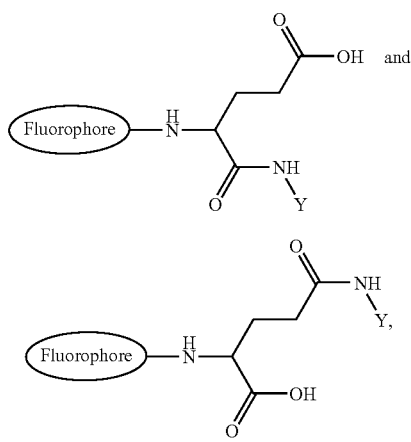

(IVa)

(IVb)

where Y is a water-solubilizing moiety. The carboxylic acid group in the linker compound can be further modified to yield reactive group Z that can be used for covalent coupling of the fluorescent label compound to other molecules. These reactive derivatives have the following structures (Va and Vb):

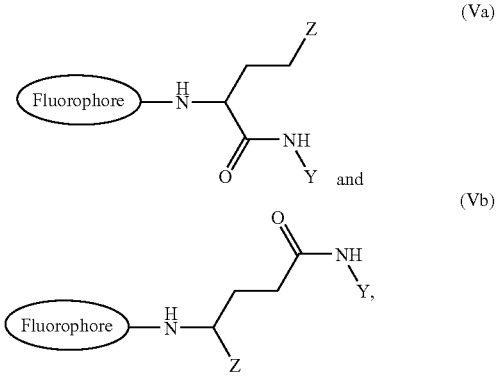

(Va)

(Vb)

where Z is a reactive group that can be used for covalent coupling of the fluorescent label compound to other molecules and Y is a water-solubilizing moiety. The reactive group Z is preferably a carboxylic acid, a carboxylic acid reactive ester or a carboxylic acid anhydride. Alternatively the reactive group Z is a —CONH-L-A, wherein L is a linking moiety which is preferably a $C_1$–$C_{20}$ straight or branched alkylene, arylene, alkarylene, aralkylene group or a combination of these and may also contain heteroatoms, substituted heteroatoms or heteroatoms containing sidechains, or cyclic residues and may also comprise or be composed of residues of polymers, preferably residues of polymers such as polypeptides, polysaccharides, polynucleotides, polyethers or other, and wherein A is a reactive group that can be used for covalent coupling of the fluorescent label to other molecules and which preferably is a carboxylic acid, a carboxylic acid reactive ester, a carboxylic acid anhydride, a maleimide, a sulfonyl halide, a hydrazine, an amine, a hydroxy, an acyl azide, an isocyanate, an aldehyde, a haloacetamide, a triazine or an isothiocyanate. The reactive group Z can also be —COO-L-A, wherein L is a linking moiety which is preferably a $C_1$–$C_{20}$ straight or branched alkylene, arylene, alkarylene, aralkylene group or a combination of these and may also contain heteroatoms, substituted heteroatoms or heteroatoms containing sidechains, or cyclic residues and may also comprise or be composed of residues of polymers, preferably residues of polymers such as polypeptides, polysaccharides, polynucleotides, polyethers or other, and wherein A is a reactive group that can be used for covalent coupling of the fluorescent label to other molecules and which preferably is a carboxylic acid, a carboxylic acid reactive ester, a carboxylic acid anhydride, a maleimide, a sulfonyl halide, a hydrazine, an amine, a hydroxy, an acyl azide, an isocyanate, an aldehyde, a haloacetamide, a triazine or an isothiocyanate.

According to present invention preferred linker compounds are derivatives of quaternary ammonium salts, sulfonic acids or carbohydrates. Especially preferred linker compounds are those where the water-solubilizing moiety Y is a —$CH_2CH_2SO_3^-X^+$ where $X^+$ is a cation. These linker compounds have the following structures (VIa and VIb):

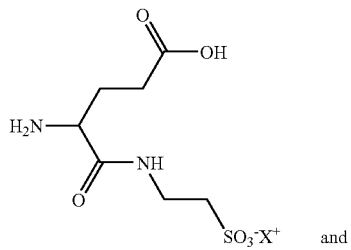
(VIa)

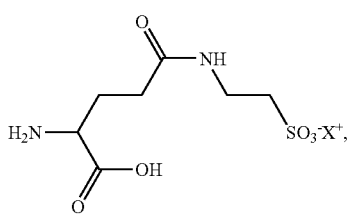
(VIb)

where X⁺ is a cation.

These highly hydrophilic glutamic acid-taurine linker compounds (Glu-Tau linkers) are ideally suited for increasing hydrophilicity of fluorescent compounds. The glutamic acid-taurine linker compounds can be attached to amino reactive fluorophores, for example to succinimidyl ester derivatives of fluorophores to yield the following structures (VIIa and VIIb):

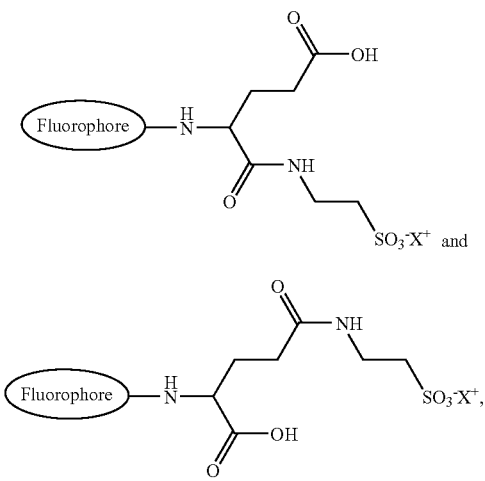
(VIIa)

(VIIb)

where X⁺ is a cation.

The carboxylic acid group in the glutamic acid-taurine linker compounds can be further modified to yield reactive group Z that can be used for covalent coupling of the fluorescent label compound to other molecules. These reactive derivatives have the following structures (VIIIa and VIIIb):

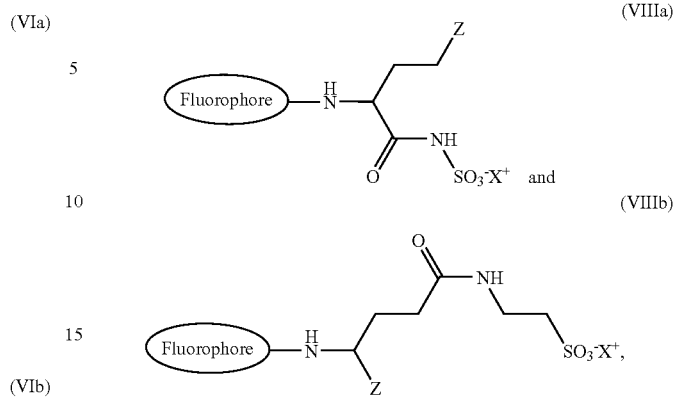
(VIIIa)

(VIIIb)

where Z is a reactive group that can be used for covalent coupling of the fluorescent label compound to other molecules and X⁺ is a cation. The reactive group Z is preferably a carboxylic acid reactive ester or an anhydride. Among the most preferred derivatives are those where the reactive group Z is a succinimidyl ester, having the following structures (IXa and IXb):

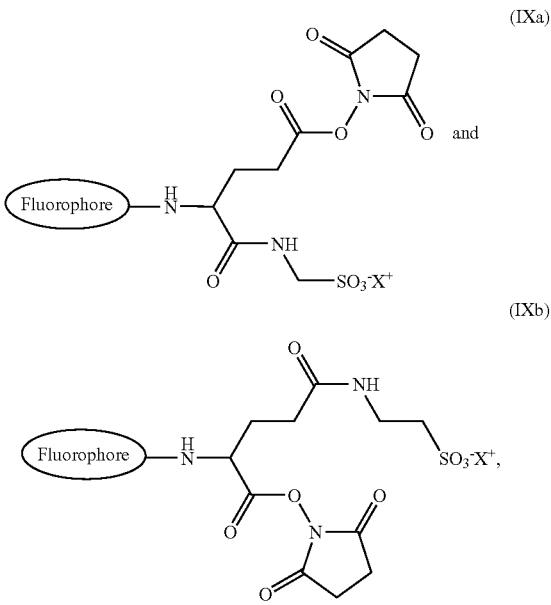
(IXa)

(IXb)

where X+ is a cation.

Dipyrrometheneboron difluoride dyes are generally hydrophobic in nature and not soluble in water. The hydrophilic linkers according to present invention are ideally suited for increasing the hydrophilicity of the dipyrrometheneboron difluoride dyes. The Glu-Tau linkers are especially useful for increasing the hydrophilicity of dipyrrometheneboron difluoride dyes that contain bulky hydrophobic substituents like aryl substituents. These aryl substituted dipyrrometheneboron difluoride dyes have generally absorption maxima above 525 nm. The Glu-Tau linkers can be easily attached to amino reactive derivatives of these dyes. The resulting dipyrromethenboron difluoride-Glu-Tau derivatives are highly soluble in aqueous solutions. The carboxylic acid residue in the dipyrromethenboron difluoride-Glu-Tau derivatives can then be further modified to yield reactive derivatives of dipyrromethenboron difluoride-Glu-Tau carboxylic acid. These new hydrophilic dipyrromethenboron difluoride-Glu-Tau labelling reagents can be used for labelling biomolecules that contain amino groups providing fluorescent conjugates with improved properties in aqueous solutions. The conjugated fluorophores show only minimal changes in their photophysical properties in comparison to the non-conjugated dipyrromethenboron difluoride dyes.

The fluorescent conjugates according to the present invention are composed of a fluorophore-hydrophilic linker unit and a biologically active molecule, such as a hapten, biologically active ligand, drug, peptide, oligonucleotide, nucleotide, nucleic acid, polypeptide, protein, antibody, or a fragment of an antibody. These conjugates are especially suitable to be used in bioanalytical assay systems that are based on fluorescence because of the increased solubility of the fluorescent conjugate to aqueous solutions and because of the high fluorescence yield of these conjugates. The unspecific binding of a fluorescent conjugate that often decreases the assay performance can be remarkably reduced by using hydrophilic linkers according to present invention. According to present invention the fluorescent conjugates that are composed of a dipyrromethenboron difluoride-Glu-Tau unit and a biologically active molecule, such as a hapten, biologically active ligand, drug, peptide, oligonucleotide, nucleotide, nucleic acid, polypeptide, protein, antibody, or a fragment of an antibody, are especially preferred.

The fluorescent conjugates according to present invention are especially suitable to be used in a bioanalytical assay method for determining an analyte from a biological fluid or suspension, where the said analyte is a biologically active molecule such as a hapten, biologically active ligand, drug, peptide, oligonucleotide, nucleotide, nucleic acid, polypeptide, protein, antibody, or a fragment of an antibody. The fluorescent conjugates according to present invention are also suitable to be used for staining of cells and tissues using cytological or histological staining methods.

Figure 2A:
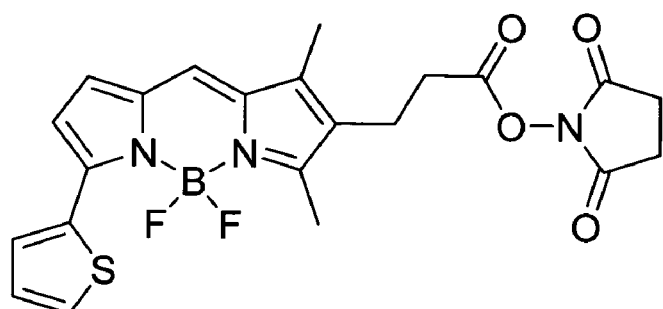
FIGS. 2a to 2e show glutamic acid-taurine derivatives of dipyrrometheneboron difluoride dyes, compounds 3, 4 and 6–14, and starting materials, compounds 2 and 5 corresponding to compounds 3 and 6, of examples 2 to 12. X$^+$ is a cationic counterion.
Figure 2A:
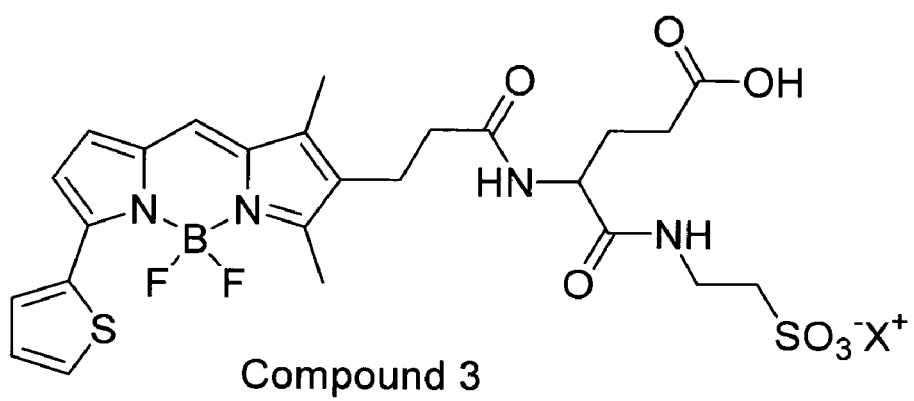
Figure 2A:
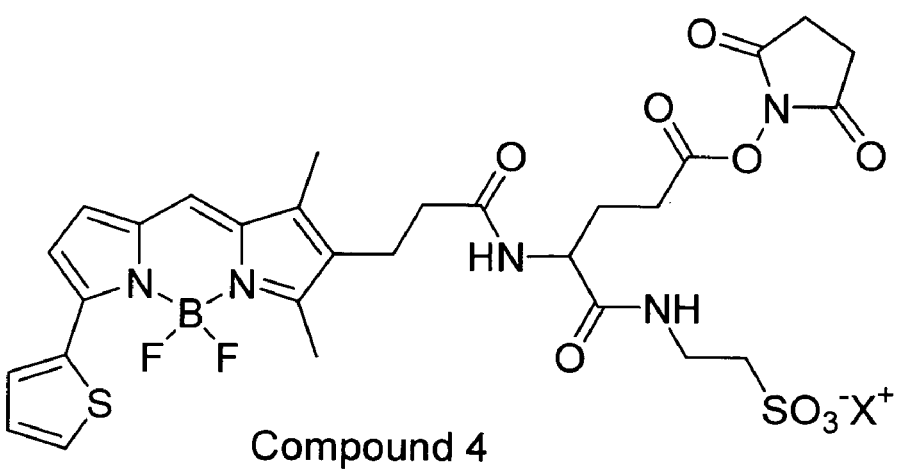
Figure 2B:
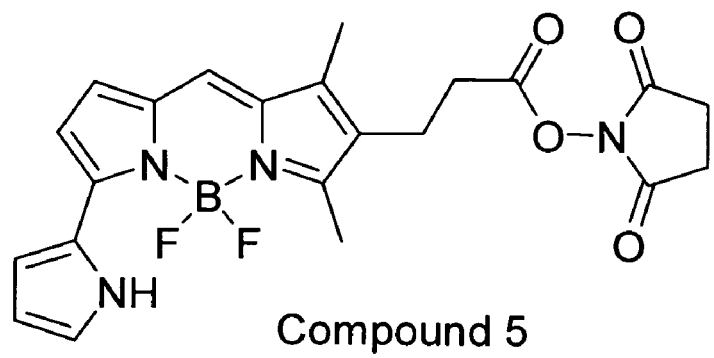
Figure 2B:
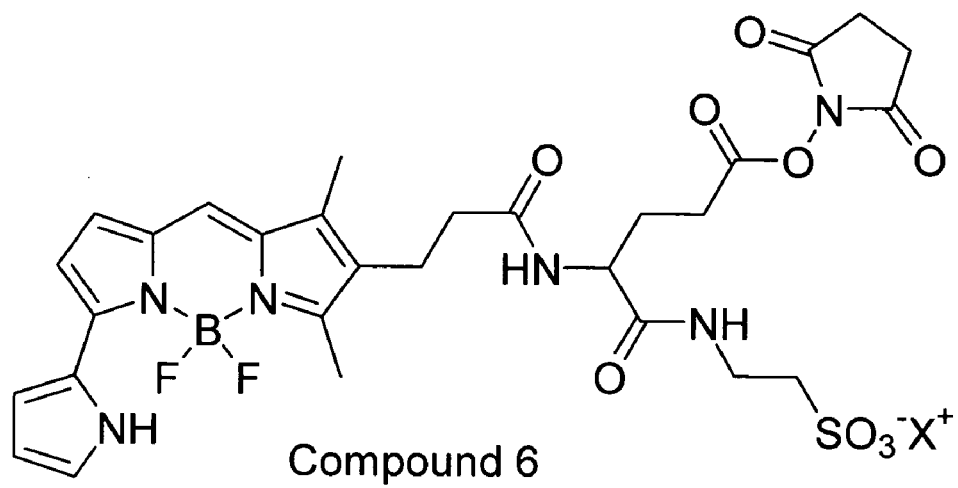
Figure 2B:
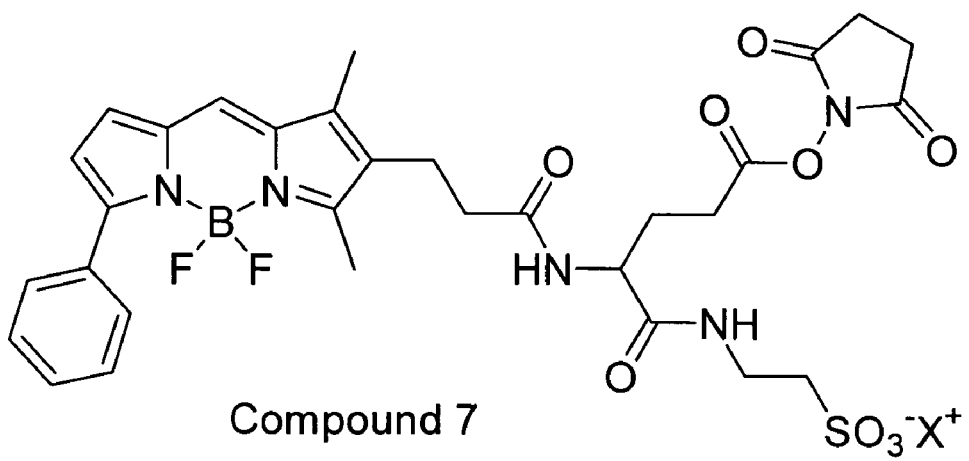
Figure 2C:
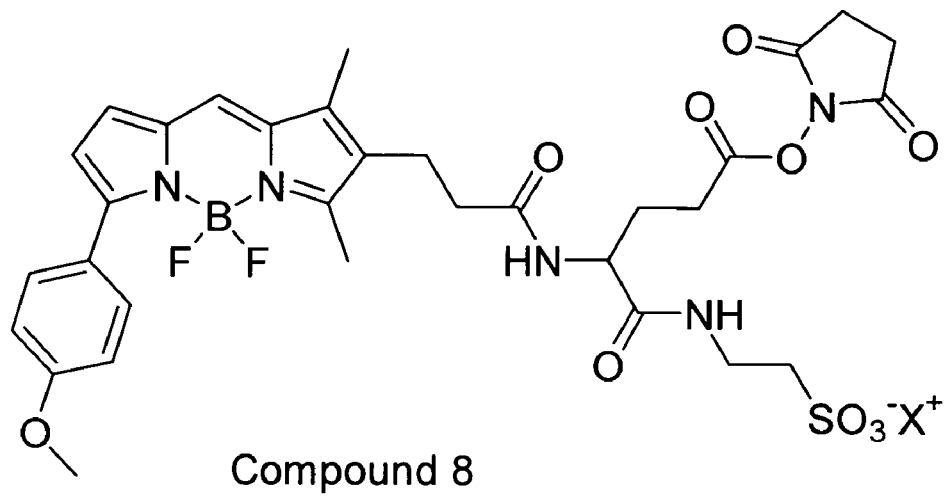
Figure 2C:
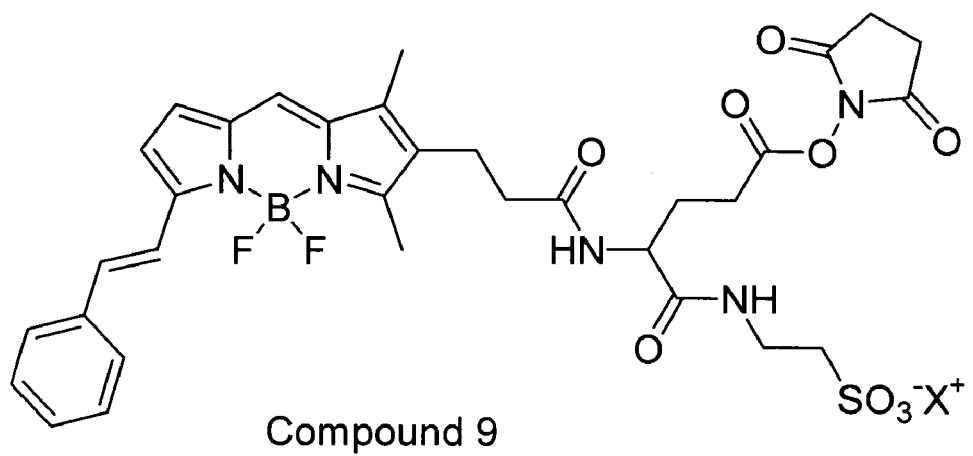
Figure 2C:
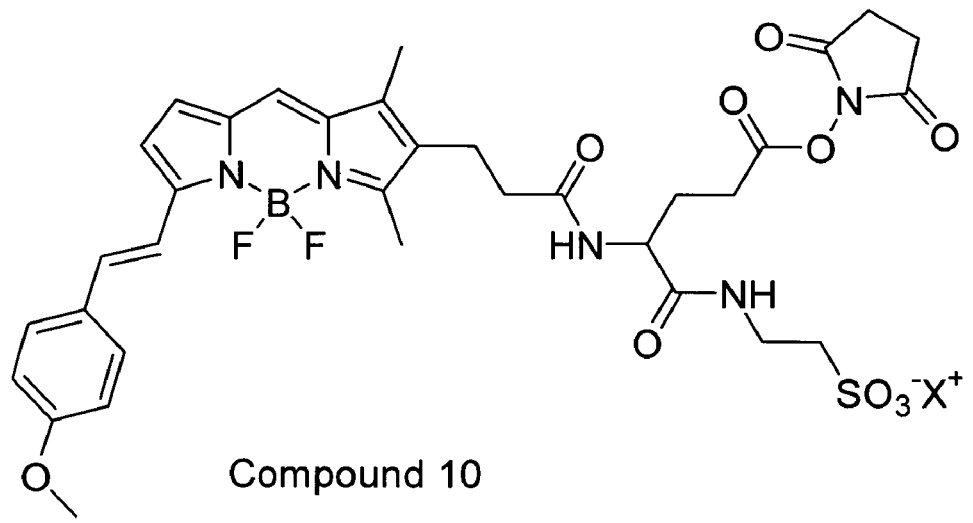
Figure 2D:
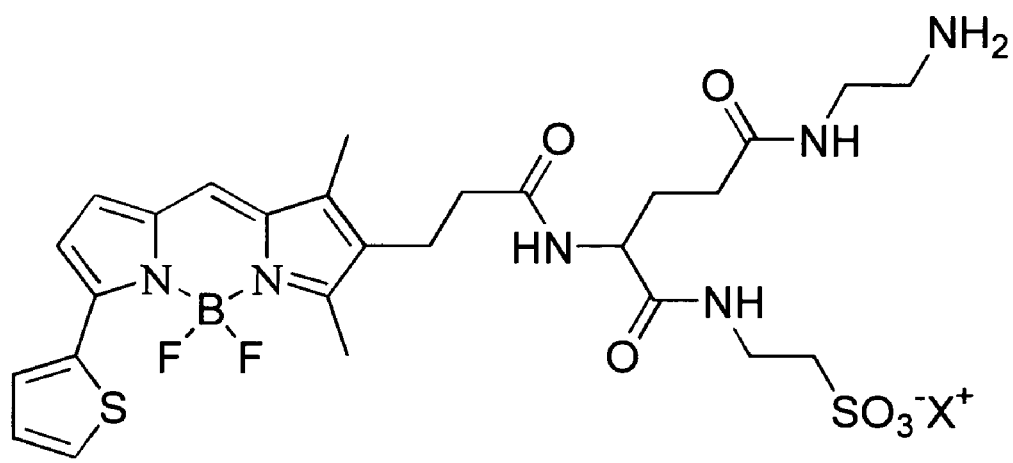
Figure 2D:
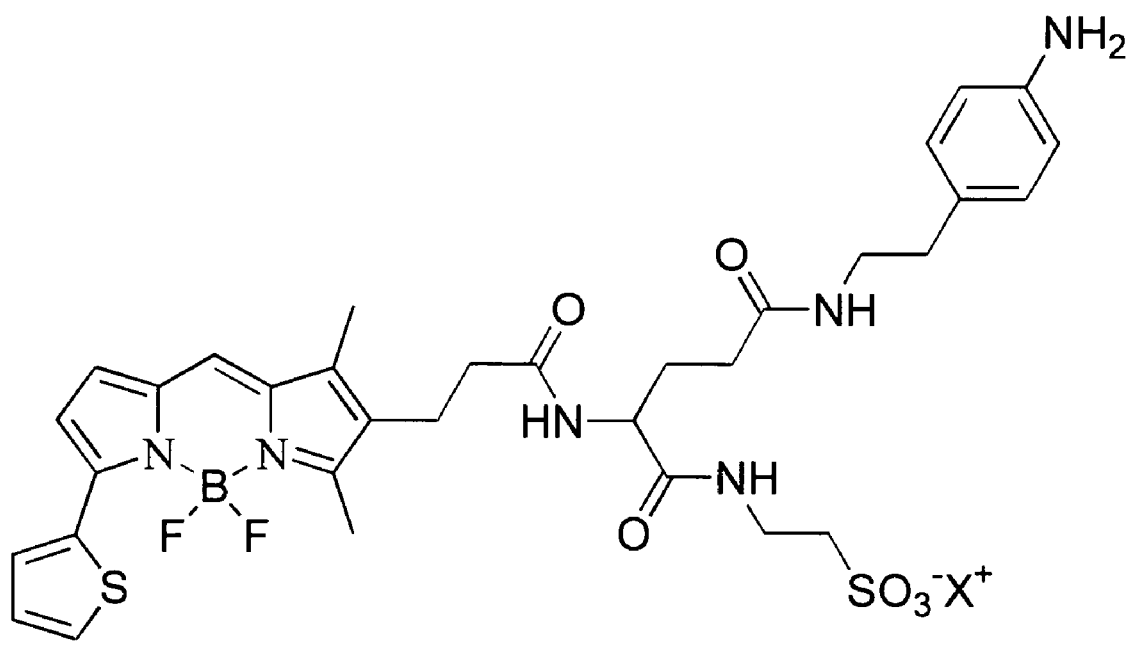
Figure 2E:
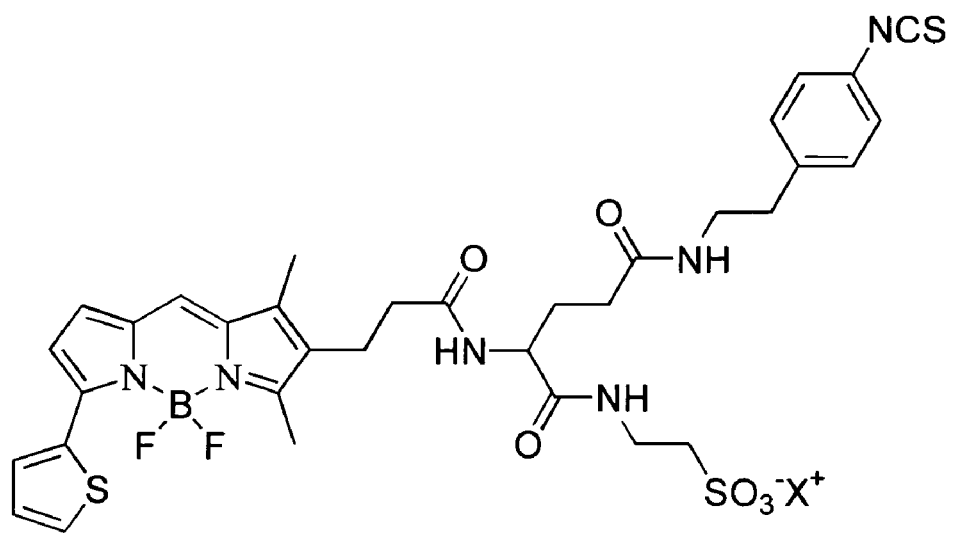
Figure 2E:
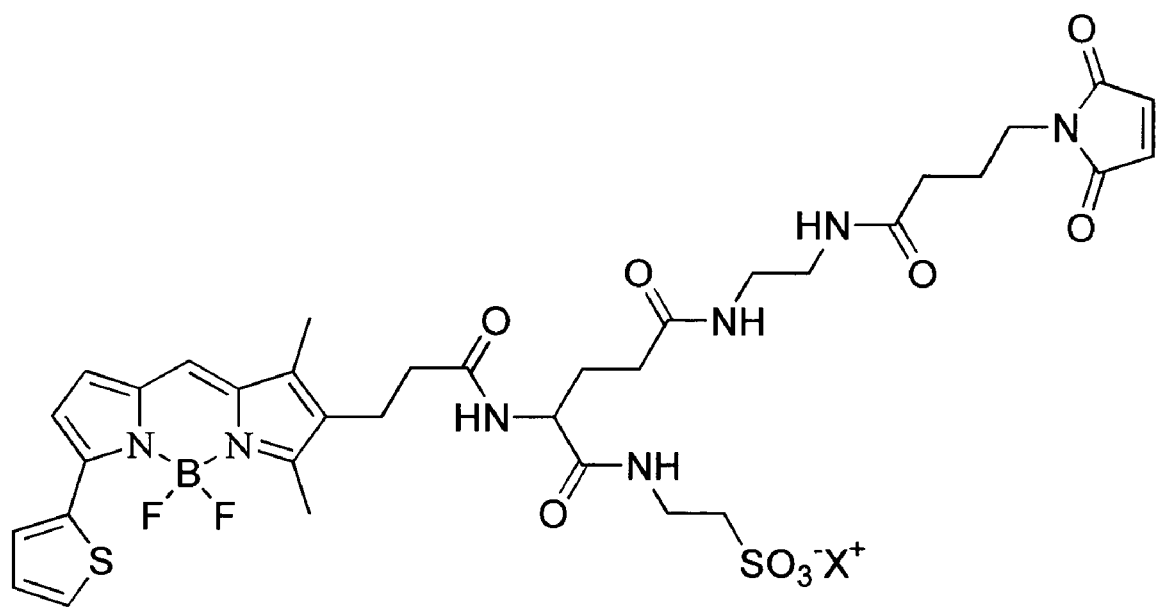
Figure 3:
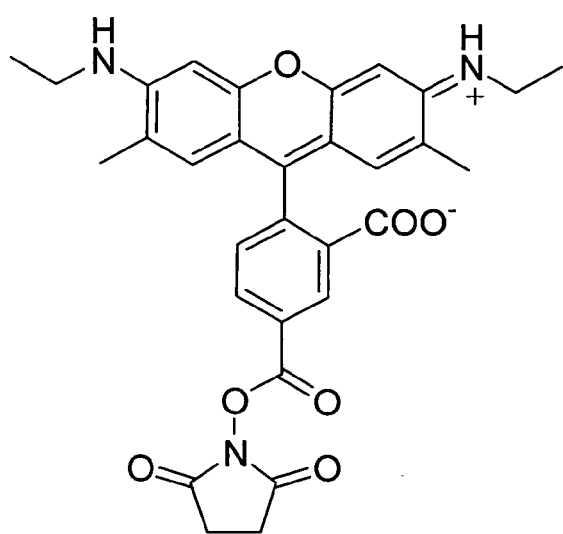
FIG. 3 shows glutamic acid-taurine derivatives of Rhodamine 6G and the corresponding starting material described as compounds 15 to 17 in examples 13 and 14. X$^+$ is a cationic counterion.
Figure 3:
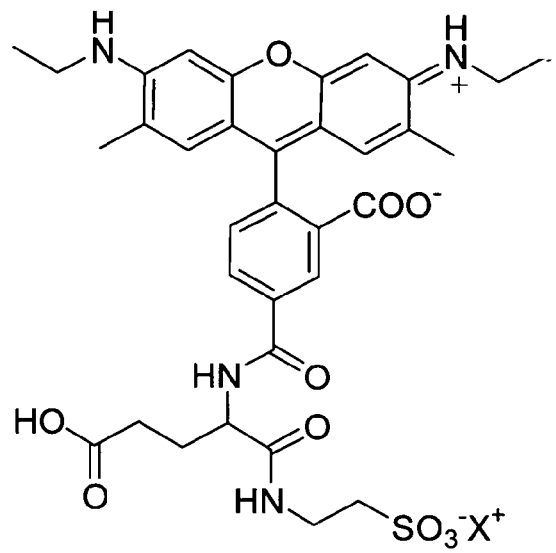
Figure 3:
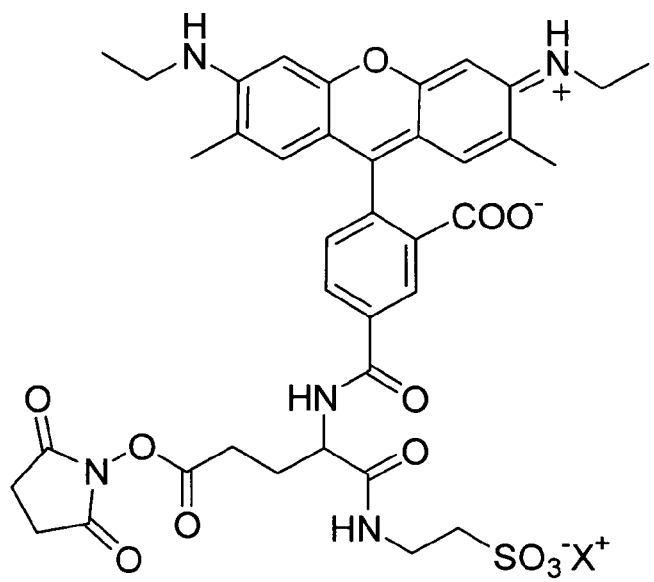

The following non-limiting examples are aimed to further demonstrate the invention. In the examples below, the compounds referred to (compounds 1 to 17) are disclosed in FIGS. 1, 2a–e and 3.

EXAMPLE 1

Synthesis of Glu-Tau Linker (1)

A glutamic acid derivative, BOC-Glu(OtBu)-OSu (Nova Biochem, 500 mg, 1.25 mmol) was dissolved in anhydrous N,N-dimethylformamide (5 ml). Taurine (782 mg, 6.25 mmol) was dissolved in a solution of triethylamine (1.20 ml, 8.75 mmol) and water (10 ml). The taurine solution was added to the solution of BOC-Glu(OtBu)-OSu and the reaction mixture was stirred at room temperature for 30 min. Ethanol was added and the precipitated taurine was filtrated and the filtrate was evaporated to dryness. The residue was dissolved in trifluoroacetic acid (2 ml) and stirred at room temperature for 2 h. The reaction mixture was evaporated to dryness and the residue was dissolved in dichloroethane:

methanol. The product was precipitated as a white solid upon slow evaporation of methanol in a rotary evaporator. The desired Glu-Tau linker, compound 1, was obtained in 64% yield (204 mg).

MS (ZABSpec-oaTOF, Fisons Instruments, glycerol matrix): Calculated 255 (M+1), Found 255 (M+1).

EXAMPLE 2

Glu-Tau-derivative of 4,4-difluoro-5-(2-thienyl)-1,3-dimethyl-4-bora-3a,4a-diaza-s-indacene-2-propionic acid (3)

4,4-difluoro-5-(2-thienyl)-1,3-dimethyl-4-bora-3a,4a-diaza-s-indacene-2-propionic acid succinimidyl ester (compound 2) (35 mg, 0.074 mmol) and Glu-Tau-linker (compound 1) (19 mg, 0.074 mmol) was dissolved in anhydrous N,N-dimethyl-formamide (1 ml). Anhydrous triethylamine (31 µl, 0.22 mmol) was added and the reaction mixture was stirred at room temperature for 30 min. The reaction mixture was evaporated to dryness under reduced pressure. The crude product, compound 3, was used without further purification.

MS (Voyager DE-PRO, MALDI TOF, PerSeptive Biosystems, α-cyano-4-cinnamic acid matrix, negative mode): Calculated 609 (M−1), Found 609 (M−1)

EXAMPLE 3

Glu-Tau-succinimide derivative of 4,4-difluoro-5-(2-thienyl)-1,3-dimethyl-4-bora-3a,4a-diaza-s-indacene-2-propionic acid (4)

Glu-Tau-derivative of 4,4-difluoro-5-(2-thienyl)-1,3-dimethyl-4-bora-3a,4a-diaza-s-indacene-2-propionic acid (compound 3) (0.074 mmol) was dissolved in anhydrous N,N-dimethylformamide (2 ml). N,N'-dicyclohexylcarbodiimide (46 mg, 0.22 mmol) and N-hydroxysuccinimide (26 mg, 0.22 mmol) were added and the mixture was stirred at room temperature for 48 h. The precipitated N,N'-dicyclohexylurea was filtrated and the filtrate was evaporated to dryness. The product, compound 4, was further dried in a vacuum desiccator and used without further purification.

MS (Voyager DE-PRO, MALDI TOF, PerSeptive Biosystems, α-cyano-4-cinnamic acid matrix, negative mode): Calculated 706 (M−1), Found 706 (M−1)

EXAMPLE 4

Glu-Tau-succinimide derivative of 4,4-difluoro-5-(2-pyrrolyl)-1,3-dimethyl-4-bora-3a,4a-diaza-s-indacene-2-propionic acid (6)

The Glu-Tau-succinimide derivative of 4,4-difluoro-5-(2-pyrrolyl)-1,3-dimethyl-4-bora-3a,4a-diaza-s-indacene-2-propionic acid, compound 6, was prepared with the same method as described in examples 2 and 3 using 4,4-difluoro-(2-pyrrolyl)-1,3-dimethyl-4-bora-3a,4a-diaza-s-indacene-2-propionic acid succinimidyl ester, compound 5, as a starting compound.

MS (Compound 6)(Voyager DE-PRO, MALDI TOF, PerSeptive Biosystems, α-cyano-4-cinnamic acid matrix, negative mode): Calculated 689 (M−1), Found 689 (M−1)

EXAMPLE 5

Glu-Tau-succinimide derivative of 4,4-difluoro-5-phenyl-1,3-dimethyl-4-bora-3a,4a-diaza-s-indacene-2-propionic acid (7)

The Glu-Tau-succinimide derivative of 4,4-difluoro-5-phenyl-1,3-dimethyl-4-bora-3a,4a-diaza-s-indacene-2-propionic acid, compound 7, was prepared with the same method as described in examples 2 and 3 using 4,4-difluoro-5-phenyl-1,3-dimethyl-4-bora-3a,4a-diaza-s-indacene-2-propionic acid succinimidyl ester as a starting compound.

MS (Voyager DE-PRO, MALDI TOF, PerSeptive Biosystems, α-cyano-4-cinnamic acid matrix, negative mode): Calculated 700 (M−1), Found 700 (M−1)

EXAMPLE 6

Glu-Tau-succinimide derivative of 4,4-difluoro-5-(4-methoxyphenyl)-1,3-dimethyl-4-bora-3a,4a-diaza-s-indacene-2-propionic acid (8)

The Glu-Tau-succinimide derivative of 4,4-difluoro-5-(4-methoxyphenyl)-1,3-di-methyl-4-bora-3a,4a-diaza-s-indacene-2-propionic acid, compound 8, was prepared with the same method as described in examples 2 and 3 using 4,4-difluoro-5(4-methoxyphenyl)-1,3-dimethyl-4-bora-3a,4a-diaza-s-indacene-2-propionic acid succinimidyl ester as a starting compound.

MS (Voyager DE-PRO, MALDI TOF, PerSeptive Biosystems, α-cyano-4-cinnamic acid matrix, negative mode): Calculated 730 (M−1), Found 730 (M−1)

EXAMPLE 7

Glu-Tau-succinimide derivative of 4,4-difluoro-5-styryl-1,3-dimethyl-4-bora-3a,4a-diaza-s-indacene-2-propionic acid (9)

The Glu-Tau-succinimide derivative of 4,4-difluoro-5-styryl-1,3-dimethyl-4-bora-3a,4a-diaza-s-indacene-2-propionic acid, compound 9, was prepared with the same method as described in examples 2 and 3 using 4,4-difluoro-5-styryl-1,3-dimethyl-4-bora-3a,4a-diaza-s-indacene-2-propionic acid succinimidyl ester as a starting compound.

MS (Voyager DE-PRO, MALDI TOF, PerSeptive Biosystems, α-cyano-4-cinnamic acid matrix, negative mode): Calculated 726 (M−1), Found 726 (M−1)

EXAMPLE 8

Glu-Tau-succinimide derivative of 4,4-difluoro-5-(4-methoxystyryl)-1,3-dimethyl-4-bora-3a,4a-diaza-s-indacene-2-propionic acid (10)

The Glu-Tau-succinimide derivative of 4,4-difluoro-5-(4-methoxystyryl)-1,3-dimethyl-4-bora-3a,4a-diaza-s-indacene-2-propionic acid, compound 10, was prepared with the same method as described in examples 2 and 3 using 4,4-difluoro-5-(4-methoxystyryl)-1,3-dimethyl-4-bora-3a,4a-diaza-s-indacene-2-propionic acid succinimidyl ester as a starting compound.

MS (Voyager DE-PRO, MALDI TOF, PerSeptive Biosystems, α-cyano-4-cinnamic acid matrix, negative mode): Calculated 756 (M−1), Found 756 (M−1)

EXAMPLE 9

Glu-Tau-amino derivative of 4,4-difluoro-5-(2-thienyl)-1,3-dimethyl-4-bora-3a,4a-diaza-s-indacene-2-propionic acid (11)

Glu-Tau-succinimide derivative of 4,4-difluoro-5-(2-thienyl)-1,3-dimethyl-4-bora-3a,4a-diaza-s-indacene-2-propionic acid (compound 4) (0.062 mmol) was dissolved in anhydrous N,N-dimethylformamide (3 ml). Triethylamine (26 μl, 0.185 mmol) and ethylenediamine (42 μl, 0.62 mmol) were added and the mixture was stirred at room temperature for 30 min. The reaction mixture was evaporated to dryness and the product was precipitated from dichloromethane-carbontetrachloride. The product, compound 11, was further dried in a vacuum desiccator and used without further purification.

MS (Voyager DE-PRO, MALDI TOF, PerSeptive Biosystems, α-cyano-4-cinnamic acid matrix, negative mode): Calculated 651 (M−1), Found 651 (M−1)

EXAMPLE 10

Glu-Tau-arylamino derivative of 4,4-difluoro-5-(2-thienyl)-1,3-dimethyl-4-bora-3a,4a-diaza-s-indacene-2-propionic acid (12)

Glu-Tau-succinimide derivative of 4,4-difluoro-5-(2-thienyl)-1,3-dimethyl-4-bora-3a,4a-diaza-s-indacene-2-propionic acid (compound 4) (0.074 mmol) was dissolved in anhydrous N,N-dimethylformamide (3 ml). Triethylamine (31 μl, 0.22 mmol) and 4-(2-aminoethyl)aniline (15 mg, 0.11 mmol) were added and the mixture was stirred at room temperature for 3 h. The reaction mixture was evaporated to dryness and the product was precipitated from dichloromethane/carbontetrachloride. The product, compound 12, was further dried in a vacuum desiccator and used without further purification.

MS (Voyager DE-PRO, MALDI TOF, PerSeptive Biosystems, α-cyano-4-cinnamic acid matrix, negative mode): Calculated 727 (M−1), Found 727 (M−1)

EXAMPLE 11

Glu-Tau-isothiocyanato derivative of 4,4-difluoro-5-(2-thienyl)-1,3-dimethyl-4-bora-3a,4a-diaza-s-indacene-2-propionic acid (13)

Glu-Tau-arylamino derivative of 4,4-difluoro-5-(2-thienyl)-1,3-dimethyl-4-bora-3a,4a-diaza-s-indacene-2-propionic acid (compound 12) (0.048 mmol) was dissolved in mixture of acetone (9 ml) and NaHCO₃ (9 ml, aq, saturated). Thiophosgene (183 μl, 2.4 mmol) was added and the mixture was stirred at room temperature for 1.5 h. The reaction mixture was diluted with water (50 ml) and dichloromethane (50 ml). The aqueous phase was washed twice with dichloromethane (40 ml). The product containing aqueous phase was extracted with phenol (2*20 ml). The product containing phenol phase was washed with water (40 ml) and diluted with diethylether (200 ml). The phenol/diethylether phase was extracted with water (4*30 ml) and the combined aqueous phase was washed twice with diethylether (30 ml). The product containing aqueous phase was evaporated to dryness and the product was precipitated from dichloromethane-carbontetrachloride. The product, compound 13, was further dried and stored in a vacuum desiccator.

MS (Voyager DE-PRO, MALDI TOF, PerSeptive Biosystems, α-cyano-4-cinnamic acid matrix, negative mode): Calculated 769 (M−1), Found 769 (M−1)

EXAMPLE 12

Glu-Tau-maleimide derivative of 4,4-difluoro-5-(2-thienyl)-1,3-dimethyl-4-bora-3a,4a-diaza-s-indacene-2-propionic acid (14)

Glu-Tau-amino derivative of 4,4-difluoro-5-(2-thienyl)-1,3-dimethyl-4-bora-3a,4a-diaza-s-indacene-2-propionic acid (compound 11) (0.015 mmol) was dissolved in anhydrous N,N-dimethylformamide (3 ml). Triethylamine (2.1 µl, 0.015 mmol) and N-succinimidyl 4-maleimidobutyrate (3.2 mg, 0.020 mmol) were added and the mixture was stirred at room temperature for 2 h. The reaction mixture was evaporated to dryness and the product was precipitated from dichloromethane/carbontetrachloride. The product, compound 14, was further dried and stored in a vacuum desiccator.

MS (Voyager DE-PRO, MALDI TOF, PerSeptive Biosystems, α-cyano-4-cinnamic acid matrix, negative mode): Calculated 816 (M−1), Found 816 (M−1)

EXAMPLE 13

Glu-Tau-derivative of 5-carboxyrhodamine 6G (16)

5-carboxyrhodamine 6G succinimidyl ester, compound 15 (Molecular Probes, Eugene, Oreg.) (2 mg, 3.6 µmol) and Glu-Tau-linker, compound 1 (2 mg, 7.2 µmol) was dissolved in anhydrous N,N-dimethylformamide (100 µl). Anhydrous triethylamine (3 µl, 22 µmol) was added and the reaction mixture was stirred at room temperature for 18 h. The reaction mixture was evaporated to dryness under reduced pressure. The product was dissolved in water and purified using reversed phase column chromatography (Isolute RP-18e). The excess of linker (compound 1) and traces of N,N-dimethylformamide and triethylamine were first eluted with water. The eluent was changed to acetonitrile:water (1:10) and the Glu-Tau-derivative of 5-carboxyrhodamine 6G, compound 16, was eluted from the column. A small portion of the hydrolysed starting material was eluted from the column with acetonitrile:water (1:1). Fractions containing the product (compound 16) were combined and evaporated to dryness under reduced pressure and further dried in a vacuum desiccator over silica gel.

MS (Voyager DE-PRO, MALDI TOF, PerSeptive Biosystems, α-cyano-4-cinnamic acid matrix, positive mode): Calculated 696 (M+1), Found 696 (M+1)

EXAMPLE 14

Activation of Glu-Tau derivative of 5-carboxyrhodamine 6G (16)

Glu-Tau-derivative of 5-carboxyrhodamine 6G (compound 16, 1.4 µmol) was dissolved in acetonitrile:water (1:1). EDC and N-hydroxysuccinimide was added. The mixture was stirred at room temperature for 3 h. Formation of Glu-Tau-succinimide derivative of 5-carboxyrhodamine 6G was followed by using reversed phase thin layer chromatography (Merck RP-18) using acetonitrile:water (1:1) as eluent: $R_f$(compound 16)=0.64, $R_f$(compound 17)=0.50. The reaction mixture was directly used for labelling of mouse IgG anti-AFP (example 15). A portion of the reaction mixture was rapidly purified using reversed phase column chromatography (Isolute RP-18e) using acetonitrile:water (1:1) as eluent. The fraction containing Glu-Tau-succinimide derivative of 5-carboxyrhodamine 6G, compound 17, was immediately analysed with a mass spectrometer.

MS (Voyager DE-PRO, MALDI TOF, PerSeptive Biosystems, α-cyano-4-cinnamic acid matrix, positive mode): Calculated 793 (M+1), Found 793 (M+1)

EXAMPLE 15

Labelling of mouse IgG Anti-AFP with 5-carboxyrhodamine 6G Succinimidyl ester (15) and Glu-Tau-succinimide derivative of 5-carboxyrhodamine 6G (17)

To the solution of 0.28 mg (1.75 nmol) of mouse IgG anti-AFP in 200 µl phosphate buffered saline (10/150 mM, pH 7.4) a 10 fold excess (17.5 nmol) of 5-carboxyrhodamine 6G succinimidyl ester (compound 15, Molecular Probes, Eugene, Oreg.) in anhydrous N,N-dimethylformamide or a 20 fold excess of Glu-Tau-succinimide derivative of 5-carboxyrhodamine 6G in acetonitrile water (reaction mixture of example 14, compound 17) was added. 40 µl of NaHCO₃ (1 M, aq) was added and the mixtures were incubated at room temperature for 2 h. The products were purified with NAP-5 gel filtration column (Amersham Pharmacia Biotech, Uppsala, Sweden) using phosphate buffered saline (50/150, 10 mM NaN₃, pH 7.4) as eluent. The fast moving coloured fractions were collected.

The absorption spectrum of mouse IgG anti-AFP labelled with 5-carboxyrhodamine 6G succinimidyl ester (compound 15) showed besides the normal absorption band at 530 nm also an equi-intense absorption band at 504 nm. This additional absorption originates from hydrophobic interactions between the fluorophores and protein or between the two fluorophores. This additional absorption band however was absent in the excitation spectrum indicating that these interactions (non-fluorescent aggregates) lower the quantum efficiency of the conjugate. These non-fluorescent aggregates are typical for hydrophobic xanthene-type dyes (rhodamines and fluoresceins). Contrary to the mouse IgG anti-AFP labelled with 5-carboxy-rhodamine 6G succinimidyl ester (compound 15), the absorption spectrum of mouse IgG anti-AFP labelled with Glu-Tau-succinimide derivative of 5-carboxy-rhodamine 6G, compound 17, showed only normal absorption band at 530 nm. The absence of additional absorption band indicates higher hydrophilicity of the label and also increased distance between the fluorophore and the protein.

EXAMPLE 16

Labelling of mouse IgG Anti-AFP with fluorescent dipyrrometheneboron difluoride dyes (2, 4, 5 and 6)

To the solution of 1.5 mg (9.3 nmol) of mouse IgG anti-AFP in 400 µl phosphate buffered saline (10/150 mM, pH 7.4) a 10 fold excess (93 nmol) of compound 2, 4, 5 or 6 in anhydrous N,N-dimethylformamide was added. 40 µl of NaHCO₃ (1 M, aq) was added and the mixture was incubated at room temperature for 2 h. The products were purified with NAP-5 gel filtration column (Amersham Pharmacia Biotech, Uppsala, Sweden) using phosphate buffered saline (50/150, 10 mM NaN₃, pH 7.4) as eluent. The fast moving coloured fractions were collected. Labelling with compounds 2 and 5 resulted in almost complete precipitation of the labelled proteins while labelling with compounds 4 and 6 proceeded without any problems. The labelling degrees of these protein conjugates (compound 4 and 6) were determined spectrophotometrically. Labelling degrees of 2.1 (compound 4) and 2.3 (compound 6) fluorophores per protein were obtained.

EXAMPLE 17

Labelling of Oligonucleotide with compound 2 and with compound 4

To the solution of 5'-aminomodified oligonucleotide (17 bases, 28 µg, 5 nmol) in carbonate buffer (200 µl, 100 mM, pH 8.5) a 40 fold excess of labelling reagent (compound 2 or 4) in anhydrous DMF (50 µl) was added. Reaction mixture was incubated at 22° C. for 20 h. The labelled oligonucleotides were purifed by using reverse phase HPLC (RP-18 column) and gradient elution technique. Solvents were A: 2% acetonitrile in triethylammonium acetate buffer (50 mM, pH 7) and B: 70% acetonitrile in triethylammonium acetate buffer (50 mM, pH 7). The gradient started from 5% of solvent B and the amount of solvent B linearly raised to 40% in 25 minutes. Both dye-oligonucleotide conjugates (labelled with compound 2 or with compound 4) eluted between 18 to 22 minutes while the unlabelled oligonucleotide eluted at a timepoint of 10 minutes. The unbound labelling reagent was removed from the column by increasing the amount of solvent B to 100%.

The concentrations of the labelled oligonucleotides were determined spectrophotometrically. A labelling yield of 25% (compound 2) and 20% (compound 4) was obtained. The labelled oligonucleotides were diluted to equimolar concentrations and the fluorescence yields were determined. As a result the fluorescence yield of oligonucleotide labelled with compound 4 was found to be one order of magnitude higher than the oligonucleotide labelled with compound 2. The higher fluorescence yield of the oligonucleotide labelled with compound 4 can be explained by increased hydrophilicity of the label compound and increased distance between the label and the oligonucleotide.

It will be appreciated that the present invention can be incorporated in the form of a variety of embodiments, only a few of which are disclosed herein. It will be apparent for the specialist in the field that other embodiments exist and do not depart from the spirit of the invention. Thus, the described embodiments are illustrative and should not be construed as restrictive.

The invention claimed is:

1. A fluorescent label compound of formula

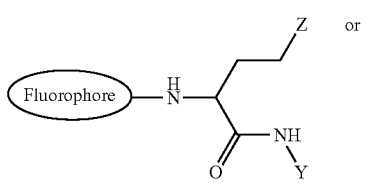

(Va)

or

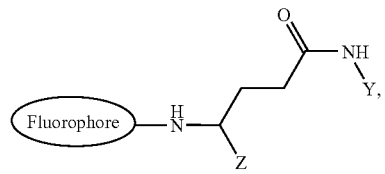

(Vb)

wherein

Z is a reactive group selected from the group consisting of a carboxylic acid, a carboxylic acid reactive ester, a carboxylic acid anhydride, —CONH-L-A and —COO-L-A; wherein L is a linking moiety, and wherein A is a reactive group selected from the group consisting of carboxylic acid, carboxylic acid reactive ester, carboxylic acid anhydride, maleimide, sulfonyl halide, hydrazine, amine, hydroxy, acyl azide, isocyariate, aldehyde, haloacetamide, triazine and isothiocyanate, wherein the fluorophore is a dipyrrometheneboron difluoride dye and Y is a water-solubilizing moiety.

2. The fluorescent label compound of claim 1, wherein said water-solubilizing moiety Y is —CH$_2$CH$_2$SO$_3^-$ X$^+$ where X$^+$ is a cation.

3. The fluorescent label compound of claim 1, wherein said compound has an absorption maximum above 525 nm.

4. The fluorescent label compound of claim 1, wherein Y is a quaternary ammonium salt, a sulfonic acid or a carbohydrate.

5. The fluorescent label compound of claim 1, wherein L is a member of the group consisting of a C$_1$–C$_{20}$ straight or branched alkylene, arylene, alkarylene, aralkylene group, and wherein L is unsubstituted or substituted with heteroatoms.

6. The fluorescent label compound of claim 1, wherein L is cyclic or a polymer.

7. The fluorescent label compound of claim 6, wherein L is a polymer selected from the group consisting of polypeptides, polysaccharides, polynucleotides and polyethers.

8. A fluorescent conjugate comprising a biologically active molecule labelled with a fluorescent label compound of claim 1.

9. The fluorescent conjugate of claim 8, wherein said biologically active molecule is a hapten, biologically active ligand, drug, peptide, oligonucleotide, nucleotide, nucleic acid, polypeptide, protein, antibody, or a fragment of an antibody.

10. In a bioanalytical assay method for determining an analyte from a biological fluid or suspension, the improvement comprising using at least one biologically active molecule wherein at least one of said biologically active molecules is labelled with the fluorescent label compound of claim 1.

11. The method of claim 10, wherein said analyte is a biologically active molecule.

12. The method of claim 11, wherein said biologically active molecule is a member of the group consisting of a hapten, biologically active ligand, drug, peptide, oligonucleotide, nucleotide, nucleic acid, polypeptide, protein, antibody, and a fragment of an antibody.

13. In a cytological or histological staining method comprising at least one biologically active molecule, the improvement comprising using at least one of said biologically active molecules labeled with the fluorescent label compound of claim 1.

14. A method for increasing hydrophilicity of a fluorescent compound, wherein said fluorescent compound is an amino reactive dipyrrometheneboron difluoride and the said fluorescent compound is reacted with the amino group of a hydrophilic glutamic acid linker compound that has the structure (IIIa) or (IIIb),

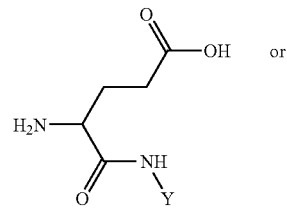
(IIIa)

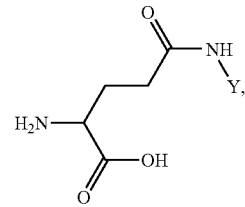
(IIIb)

wherein Y is a water-solubilizing moiety having the formula—$CH_2CH_2SO_3^- X^+$ where $X^+$ is a cation.

* * * * *